(12) United States Patent
Hooper

(10) Patent No.: US 10,843,124 B2
(45) Date of Patent: Nov. 24, 2020

(54) PROCESS AND CONTACTOR VESSEL FOR THE ABSORPTION OF TARGET GAS BY COUNTER-CURRENT ABSORPTION PROCESS AND FLUIDISED BED

(71) Applicant: REDEEM CCS PTY LTD, Melbourne (AU)

(72) Inventor: Barry Hooper, Melbourne (AU)

(73) Assignee: REDEEM CCS PTY LTD, Melbourne (AU)

( * ) Notice: Subject to any disclaimer, the term of this patent is extended or adjusted under 35 U.S.C. 154(b) by 268 days.

(21) Appl. No.: 15/776,018

(22) PCT Filed: Nov. 16, 2016

(86) PCT No.: PCT/AU2016/051103
§ 371 (c)(1),
(2) Date: May 14, 2018

(87) PCT Pub. No.: WO2017/083917
PCT Pub. Date: May 26, 2017

(65) Prior Publication Data
US 2018/0296972 A1     Oct. 18, 2018

(30) Foreign Application Priority Data

Nov. 16, 2015   (AU) .................................. 2015904710

(51) Int. Cl.
*B01D 47/00* (2006.01)
*B01D 53/18* (2006.01)
(Continued)

(52) U.S. Cl.
CPC ............. *B01D 53/18* (2013.01); *B01D 47/02* (2013.01); *B01D 47/021* (2013.01); *B01D 47/14* (2013.01);
(Continued)

(58) Field of Classification Search
CPC ........ B01F 3/04; B01F 3/04078; B01D 47/00; B01D 47/14; B01D 47/02; B01D 47/021; B01D 53/18
(Continued)

(56) References Cited

U.S. PATENT DOCUMENTS 3,556,490 A * 1/1971 Bocknnan ............... B01D 47/06
261/98
4,820,391 A * 4/1989 Walker ................... B01D 53/60
204/526
(Continued)

FOREIGN PATENT DOCUMENTS

CA    2832887 A1   10/2012
CA    2673781 C    3/2013
(Continued)

OTHER PUBLICATIONS

Australian International Search Report dated Aug. 10, 2017.

*Primary Examiner* — Robert A Hopkins
(74) *Attorney, Agent, or Firm* — Amster, Rothstein & Ebenstein LLP

(57) ABSTRACT

The present invention relates to a process and contactor vessel in which gas and liquid contact occurs to facilitate mass transfer therebetween. In one embodiment, the process includes a fluidised bed including mobile inert primary objects and secondary particles that facilitate turbulent mixing and enhanced gas/liquid surface area in the contactor.

26 Claims, 3 Drawing Sheets

(51) Int. Cl.
*B01F 3/04* (2006.01)
*B01D 53/14* (2006.01)
*B01D 53/78* (2006.01)
*B01D 47/02* (2006.01)
*B01D 47/14* (2006.01)
*B01D 53/62* (2006.01)

(52) U.S. Cl.
CPC ......... *B01D 53/14* (2013.01); *B01D 53/1412* (2013.01); *B01D 53/1475* (2013.01); *B01D 53/78* (2013.01); *B01F 3/04078* (2013.01); *B01D 53/62* (2013.01); *B01D 2251/306* (2013.01); *B01D 2251/606* (2013.01); *B01D 2252/102* (2013.01); *B01D 2252/204* (2013.01); *B01D 2252/20494* (2013.01); *B01D 2256/24* (2013.01); *B01D 2257/302* (2013.01); *B01D 2257/304* (2013.01); *B01D 2257/404* (2013.01); *B01D 2257/504* (2013.01); *B01D 2258/0283* (2013.01); *B01D 2259/65* (2013.01); *F23J 2219/40* (2013.01); *Y02C 10/06* (2013.01)

(58) Field of Classification Search
USPC .......................................................... 96/236
See application file for complete search history.

(56) References Cited

U.S. PATENT DOCUMENTS

| 5,302,361 A | 4/1994 | Nagl |
| 2012/0122195 A1 | 5/2012 | Fradette et al. |
| 2014/0349366 A1 | 11/2014 | Fradette et al. |
| 2015/0010453 A1 | 1/2015 | Gellett et al. |

FOREIGN PATENT DOCUMENTS

| SU | 975026 A | * 11/1982 | ............... B01D 3/42 |
| WO | 14071511 A | 5/2014 | |

* cited by examiner

PROCESS AND CONTACTOR VESSEL FOR THE ABSORPTION OF TARGET GAS BY COUNTER-CURRENT ABSORPTION PROCESS AND FLUIDISED BED

FIELD OF THE PRESENT INVENTION

The present invention relates to a process and contactor vessel in which gas and liquid contact occurs to facilitate mass transfer therebetween. The process may also facilitate heat transfer between the gas and liquid phases. By way of example, the present invention relates to processing industries such as, acid gas capture from flue gas streams and other industrial gas streams, in which a targeted gas species is absorbed by an absorbent material, and then stripped from the absorbent material in a regenerating step.

BACKGROUND

Gas absorption using various solvents is one of the most important processes in the chemical and petrochemical industry. The process is based on mass transfer through a gas-liquid boundary layer. In order to obtain maximum absorption efficiency, it is necessary to use appropriate equipment to maximise gas-liquid contact. Contactors are critical unit operations for any chemical transformation process and are widely used across the energy, chemical, pharmaceutical and food processing industries. The most widely used mass transfer devices are used in operations such as distillation, gas absorption and liquid extraction to name a few.

Conventional gas liquid contactors have developed over many generations. These vessels contain the fluids and have physical internals such as trays or packing, either dumped or structured. The actual form of the packing can be rings of various designs, meshes or stacked corrugated sheets. They can be made of plastic, metal, glass or ceramic material to name a few. They run within narrow operating windows between minimum and maximum flows with the liquid at low Reynolds Number.

Contactors without packing, such as bubble and spray columns, provide the necessary mass transfer surface area by the formation of gas bubbles or liquid droplets. In the case of bubble columns gas is required to flow through a deep column of liquid to achieve the necessary mass transfer resulting in higher pressure drops than packed systems. Spray columns have a lower pressure drop but have relatively low surface area compared to higher surface area packed systems.

Packed columns remain the mainstay and movement from simple dumped packing has spawned several generations of packing. The latest version of structured packing is designed to intensify the operation by increasing the contacting area between the phases for a given volume, making equipment smaller or more efficient and reducing equipment costs. The packing itself comes at a cost and together with the necessary support and associated gas and liquid distribution systems can be as costly as the columns within which they are installed.

The operation of packed columns is normally constrained by the pressure drop and the fluid flow characteristics of the gas and liquids. The search for ever increasing contacting area traditionally comes at the expense of pressure drop. Most packing operates with liquid flowing downwards under gravity over the packing and contacting with the gas flowing upwards. The opposing flow streams contact over the packing area and operate within a window where pressure drop is acceptable. There is a minimum flow rate that 'wets' the surface area (on the low side) and a maximum below which the packing does not 'flood' (pressure drop dramatically rises outside the processing bounds). The packing, of any form, also creates holdup in the contactor which is the volume of the absorbent flow retained dynamically in the bed during operation by the gas flow. For all packed contactors once the gas flow ceases the 'liquid' holdup drains from the packing.

Packed columns generally require 'clean' fluids and where higher amounts of solids exist or come into existence during the process certain types of packing are preferred. The preferred packing has wider gaps and as a result, tend to have lower available surface area for mass transfer. Consequently, there are a number of trade-offs for conventional systems of pressure drop, surface area, the intensity of the surface area per unit volume and solids tolerance.

An alternative system which is said to be tolerable of the formation of solids in the absorber has been developed by WES Environmental Systems. The system is a froth based absorber which uses a gas liquid ratio and a froth generation device to provide a high contact surface area and simultaneously, allow the solids formed in the system to be carried out of the absorber. The froth system can be used with pulsating flow to enhance the mass transfer rate and requires the gas and liquid phases to flow co-currently.

A particular area of gas processing that has been the focus in the last ten to fifteen years has been that of carbon capture from flue gas streams or syngas streams. The post combustion capture option, in particular, can require contactors, referred to as absorption columns, that are larger than any other process currently deployed. Added to the fact that this system operates on low pressure gas makes the trade-off between pressure drop and area paramount. While commercial providers are now beginning to offer process solutions that can be used in these services it still comes at a price and is largely focussed on existing processing solvents involving purely liquid and gas contact.

It is therefore an objective of the present invention to provide an alternative process and contactor vessel for mass transfer between in gas and liquid phases that has enhanced contact surface area and can be used for a broader range of solvents which either exhibit higher viscosities than conventional liquid solvents or those that exhibit phase change behavior, for example solids formation from saturated liquids. The higher surface area could be useful for all solvents including those with slower kinetics, which might have been discounted previously due to the need for additional costly packed volumes.

SUMMARY OF THE PRESENT INVENTION

The present invention relates to a process in which a targeted gas species is absorbed by an absorbent, the process including:
  providing a vessel containing fluidisable packing, hereinafter referred to as primary objects, the vessel having a gas inlet located in a lower portion of the vessel via which a gas stream containing a targeted gas species enters the vessel, and an absorbent inlet located in an upper portion of the vessel via which an absorbent stream containing an absorbent is fed into the vessel;
  feeding the gas stream into the gas inlet and conveying the gas stream upwardly in the vessel so as to fluidize the primary objects and form a fluidized bed within the vessel;

feeding the absorbent stream into the absorbent inlet and conveying the absorbent stream downwardly in the vessel so that the absorbent stream absorbs the targeted gas species from the gas stream and forms a precipitate that reduces the partial pressure of the targeted gas species in the absorbent stream while being conveyed through the fluidized bed of the vessel;

controlling the flow rates of the gas stream and the absorbent stream through the bed so that the primary objects move within the fluidized bed, creating turbulence in the absorbent stream and the gas stream in the fluidised bed, and liquid hold-up in the fluidized bed;

withdrawing from the vessel a slurry product stream having a liquid phase rich in the targeted gas species, and the precipitate, while the primary objects are retained in the vessel.

The present invention also relates to a contactor vessel including:

a bed of fluidisable packing, hereinafter referred to as primary objects that are retained in the bed, a gas inlet located in a lower portion of the vessel via which a gas stream containing a targeted gas species enters the vessel and is conveyed upwardly through the bed, and an absorbent inlet located in an upper portion of the vessel via which an absorbent stream containing an absorbent is fed into the vessel and conveyed downwardly through the bed;

a controller that controls the flow rates of the gas stream and the absorbent stream through the bed so that the primary objects move in a turbulent manner within the fluidized bed, creating holdup and providing a surface on which contact between the absorbent stream so that the absorbent stream absorbs the targeted gas species from the gas stream and forms a precipitate containing the targeted species that reduces the partial pressure of the targeted gas species and provides additional surface area for gas liquid contact in the absorbent stream while being conveyed through the fluidized bed;

an outlet in a lower region of the contact vessel that discharges a slurry product stream having liquid phase rich in the targeted gas species and the precipitate.

An advantage of the present invention is that it provides greater surface area on which to exploit the turbulent movement of the primary objects which in itself enhances mass and energy transfer rates between the gas and liquid/slurry phases through rapid surface renewal between the gas and liquid phases. The fluidized nature of the process reduces the pressure differential across the contactor compared to say bubble columns and allows the contactor to effectively handle solids precipitating in the bed by minimising blockage of the bed by the particles. In other words, the present invention may be capable of intensifying i.e., reducing the size of and making more efficient use of, the transfer operations, which in turn, can reduce capital expenditure and operating expenditure.

The pressure drop across the fluidised bed may be dependent on a range of parameters including gas velocity, primary particle size and density, and liquid density. Ideally, the pressure drop may be in the range of 0.5 to 5 kPa/m of bed height, and suitably in the range of 0.5 to 2.0 kPa/m of bed height.

Ideally, the movement of the primary objects increases the turbulence within the contactor vessel, which has a mixing effect. In other words, the primary objects create turbulent flow (compared to the low Reynolds Number flow typical of conventional contactors) of the absorbent stream over a majority of the bed, and suitably over at least 75% of the height of the bed, and ideally, over at least 90% of the height of the bed. As turbulence increases so too does Reynolds number, however, it is not practical to specify a particular Reynolds number.

The process may include conveying secondary particles that are smaller than the primary objects, through the fluidized bed, in which the secondary particles provide additional surface area for gas liquid contact.

In one example, the secondary particles may be entrained or included in the absorbent stream, and the secondary particles pass through the bed with the absorbent stream.

A makeup stream of the secondary particles may be added to the fluidized bed and/or the absorbent stream. The makeup stream may be separate from the absorbent stream.

An advantage of this aspect is that the process can include controlling the total surface area for liquid/gas contact in the bed, by for example, adjusting the concentration of the secondary particles in the bed, and the liquid hold-up volume, while the fluidised bed is in operation. That is, the surface area for adjusting liquid/gas contact in the bed can be adjusted by increasing the concentration of the secondary particles, for example, in the absorption stream and does not interrupt or prevent the gas stream from being fed to the vessel. The secondary particles may provide a significant increase in available surface area for liquid/gas contact without causing an increase in the pressure drop across the bed. Controlling the liquid/gas surface area within the hold-up volume in the expanded bed may include adjusting the concentration of primary objects and/or the secondary particles in the bed.

The secondary particles may be fed to the fluidized bed in a slurry stream. In other words, the fluidized bed may be dosed with the secondary particles.

The present invention relates to a process carried out in a contactor, the process including:

conveying a gas stream upwardly through packing in the contactor, hereinafter referred to as primary objects, to form a fluidized bed of the primary objects, wherein the gas stream includes a targeted gas species;

conveying the absorbent stream downwardly through the fluidized bed in the contactor vessel;

wherein the primary objects provide a surface on which the absorbent stream and the gas stream contact so the absorbent stream absorbs the targeted gas species, and forms a precipitate containing the targeted species, wherein a precipitate reduces the partial pressure of the targeted gas species in the absorbent stream;

controlling the flow rates of the gas stream and the absorbent stream through the fluidized bed so that the primary objects create turbulence in the fluidized bed and, in turn, enhance the rate of absorption of the targeted gas species into the absorbent stream;

withdrawing from the vessel a slurry product stream having liquid phase rich in the targeted gas species, and the precipitant; and retaining the primary objects in the fluidized bed.

The present invention relates to a process in which a targeted gas species is absorbed by an absorbent, the process including:

providing a vessel containing fluidisable packing hereinafter referred to as primary objects, a gas inlet located in a lower portion of the vessel via which a gas stream containing a targeted gas species enters the vessel, and an absorbent inlet located in an upper portion of the vessel via which an absorbent stream containing an absorbent is fed into the vessel;

feeding the gas stream into the gas inlet and conveying the gas stream upwardly in the vessel so as to fluidize the primary objects and form a fluidized bed within the vessel;

feeding the absorbent stream into the sorbent inlet and conveying the absorbent stream downwardly in the vessel to allow the absorbent stream to absorb the targeted gas species from the gas stream while being conveyed through the fluidized bed of the vessel;

controlling the flow rates of the gas stream and the absorbent stream through the bed so that the primary objects move within the fluidized bed, create turbulence, and liquid hold-up;

withdrawing from the vessel a product stream having liquid phase rich in the targeted gas species, while the primary objects are retained in the vessel.

The present invention also relates to a contactor vessel including:

a bed of fluidisable packing having a cross-section of less than or equal to 10 mm, hereinafter referred to as primary objects that are retained in the bed, a gas inlet located in a lower portion of the vessel via which a gas stream containing a targeted gas species enters the vessel and is conveyed upwardly through the bed, and an absorbent inlet located in an upper portion of the vessel via which an absorbent stream containing an absorbent is fed into the vessel and conveyed downwardly through the bed;

a controller that controls the flow rates of the gas stream and the absorbent stream through the bed so that the primary objects move in a turbulent manner within the fluidized bed, and the primary objects provide a surface on which contact between the absorbent stream so that the absorbent stream absorbs the targeted gas species from the gas stream;

an outlet in a lower region of the contact vessel that discharges a product stream having liquid phase rich in the targeted gas species and the precipitate.

DETAILED DESCRIPTION

The primary objects may be inert to the acid gas and the absorbent stream. For instance, the primary objects may be any size when the process includes secondary particles and/or precipitates.

The primary objects may have any suitable shape, density and cross-section so as to be fluidized and create turbulence in the absorbent stream. In one example, the primary objects may be hollow objects such as spherical balls or ellipsoidal balls. The primary objects may also be asymmetric, for example, by means of dimples in the outer surface thereof.

The performance of the primary objects will be determined by the cross-section and density, and the relative flow rates of the liquid absorbent stream and the gas stream and their respective fluid properties.

One aspect of the invention is about creating additional surface area in a highly turbulent fluid contactor to enhance their capability to process large mass and heat transfer duties in more intense cost effective applications. Creating the additional area, compared to prior art processes is to reduce the size of the primary objects to a size at or below the 'diameter' considered ideal for conventional turbulent gas absorbers.

The primary objects may have any suitable size, for example, a diameter in the range of 5 to 50 mm, and suitably 10 to 50 mm, or even more suitably from 10 to 40 mm. The diameter may be an equivalent diameter determined by the square root of the surface area (SA) of the primary objects (or secondary particles) divided by "pi" according the formula $\sqrt{SA/\pi}$.

Ideally, the primary objects have a diameter of less than or equal 10 mm, for example in the range in 5 to 10 mm. This size range is typically smaller than the fluidized packing presently available. An advantage in having a reduced size is that the surface area per unit volume of the packing increases however in doing so, without careful consideration, the particle density is likely to increase and increase contactor pressure drop.

The primary objects may have a density in the range of 80 to 500 kg/m3, and suitably in the range of the range of 150 to 300 kg/m3. Fluidisable packing undergoes considerable mechanical stress during operation. In order to achieve the required robustness in a continuous process care is necessary in choosing both the material and wall thickness. Newer manufacturing techniques, including 3D printing, and improved materials open up the possibility to allow the performance to be tailored to achieve the desired mass and heat transfer effect by enhancing area while maintaining the density and hence pressure drop within acceptable bounds.

The maximisation of contact area is critical for large scale carbon dioxide capture systems due to the significant size and capital costs of contactor vessels and any means by which the process can be intensified is valued. The contact surface area for liquid gas absorbers is to some extent a function of the bubble size of the gas phase, the surface area of the primary fluidizing objects, the respective fluid flow rates, and liquid hold-up of the fluidised bed. The most readily defined physical surface area in the system is that of the primary fluidizing objects. The effectiveness of the contact surface area and the ability to renew that surface rapidly to enhance depends on the performance characteristics. By way of example, the primary objects such as 40 mm spherical balls have a surface are of nominally 80 to 120 $m^2/m^3$, and suitably approximately 100 $m^2/m^3$. The surface area per unit volume is dependent on variables such as packing factors which reflect the spacing between the balls.

The secondary particles provide an additional means for increasing the surface area for liquid gas contact.

The secondary particles may include any one or a combination of: i) inert particles, ii) reactive particles or iii) catalytic particles.

The secondary particles may be inert to the gas stream and the absorbent stream and be made of any suitable material. For example the secondary particles may be made of any one or a combination of the following: silicates, glass, polymers or zirconium containing materials.

The secondary particles may be reactive with the gas stream and in particular the targeted species of the gas stream.

In an example, the absorbent stream may be a slurry stream in which the secondary particles include mineral particles that can react with the targeted gas species. Examples of minerals that can absorb acid gases such as carbon dioxide include calcium oxide, silicates such as olivine and serpentinite.

Either one or both of the primary objects and the secondary particles may have a catalytic constituent to enhance the reaction kinetics of the absorption of the targeted species by the absorbent.

The process may include selecting the size of the secondary particles based on one or more of the following parameters:

i) the size of the bubbles in the gas stream, ii) the flow rates and fluid properties of the gas stream and the liquid absorbent stream in the bed, iii) the density, particle size and concentration of the secondary particles in the bed, and iv) the density, size and concentration of the primary particles in the bed.

In addition, the process may include controlling the mass percentage of the secondary particles of the absorbent stream based on the density, particle size and surface area of the secondary particles. For example, when the secondary particles are inert beads, the secondary particles may have a mass percentage in the range of 0.5 to 14 wt % in the fluidised bed.

In addition to these parameters, selecting the size of the secondary particles may also be a function of the size of the primary objects and the densities of the primary objects and the secondary particles.

The main purpose of the secondary particles is to increase the total area facilitating contact between the liquid absorbent solution and the gas stream in the fluidised bed.

The secondary particles may have any suitable size range, for example, less than the size of the bubble of the gas stream entering the bed, for example up to 5 mm. As the secondary particles are not retained in the fluidized bed as are the primary objects, the secondary particles are required to pass through the physical divider/structure (support grid) that retains the primary objects in the fluidized bed.

In one example, the secondary particles may have a cross-section from nanoscale to 5000 micron, and ideally in the range of the 1 to 2000 micron, and even more suitably in the range of 1 to 1000 micron, or in the range of 1 to 100 micron. The size range of the particles can be manipulated to achieve the balance between the liquid processability and the effectiveness of the surface area, i.e., smaller particles can achieve greater nominal surface area at lower concentrations than larger particles however their success as a gas liquid contact area may be compromised depending on the fluid dynamic properties of the gas, liquid, solid particles, both primary and secondary.

The secondary particles may be added to achieve the necessary transfer rate by increasing the area component.

By way of example, the flux of $CO_2$ into a solvent is described by Equation 1 below. To obtain the overall rate of absorption, it is necessary to multiply $N_{CO2}$ by the interfacial area 'a' (m²).

$$N_{CO2} = k_L EH(P_{CO2i} - P_{CO2e})$$ Equation 1

Where:
$NO_{CO2}$ $CO_2$ Flux (kmol/hr·m²)
$k_L$ Liquid side mass transfer coefficient (m/hr)
E Enhancement Factor
H Solubility of $CO_2$ in Solution (kmol/atm·m³)
$P_{CO2i}$ Partial pressure of $CO_2$ in gas phase (atm)
$P_{CO2e}$ Equilibrium pressure of $CO_2$ in liquid phase (atm)

The nominal area improvement factor can be obtained by considering the nominal particle size (hence surface area) and concentration of particles in the solution and comparing that to the surface area of the primary objects in the bed. The efficiency of the contacting can be determined and then tuned by modifying the parameters which affect the fluid dynamics of the system.

The primary objects can be included in the bed, and the secondary particles can be added to the absorbent stream or directly to the bed. The factors determining the concentrations needed to achieve the necessary performance will have the extra dimension of catalytic activity added to that of size and density.

The process may include a regeneration step in which the loaded product stream may be regenerated to produce a regenerated absorbent and a gas stream rich in the targeted gas species. The regenerated absorbent may be used to form at least part of the absorbent stream fed to the contacting vessel.

The loaded product stream may have any suitable loading. In one embodiment in which the targeted gas species is carbon dioxide and the absorbent is an alkali carbonate, the loaded product stream may have a loading in the range of 0.5 to 1.0, and suitably in the range of 0.6 to 0.8, and even more suitably approximately 0.75.

The regenerated absorbent stream may have any suitable loading. It would normally be less than 0.5, however for high capture rates it is ideally less than 0.3. Ideally, the regenerated absorbent stream has a loading in the range of 0.15 to 0.3.

While the lean regenerated stream may have bicarbonate precipitates, ideally the absorbent stream is free or substantially free of precipitates when the absorbent stream is feed to the contactor vessel.

In one embodiment, the secondary particles may be conveyed through a regeneration step to help volatilize the targeted gas species from the absorbent and provide surface area to enhance desorption.

In another embodiment, the secondary particles may be separated from the product stream. Separation of the secondary particles from the product stream may be carried out by physical means such as hydrocyclones in a range of process steps depending on the physical and chemical characteristics of the precipitates and/or secondary particles, with or without catalytic effect.

The gas stream may be in the form of bubbles in the fluidised bed. For example, the gas stream may be fed by a sparging device or perforated plate into the fluidised bed.

The process may include controlling the size of the bubbles of the gas stream in the fluidized bed to adjust one or more of the following properties of the fluidized bed, namely: turbulence of the fluidized bed, renewal of the absorbent on the surface of the particles, and retention of the secondary particles in the fluidized bed.

The process and contactor vessel described herein could be used in any suitable industrial application. In one example, the targeted gas species may be an acid gas, such as carbon dioxide from the gas stream. Other examples of acid gases include, nitrogen containing gases such as $NO_x$, and sulfur containing gases such as sulphur dioxide and hydrogen sulphide.

Ideally, the absorbent is a phase changing absorbent in which, when the absorbent reacts with targeted gas species, the absorbent creates a reacted product which builds up to a point where the precipitate forms in the absorbent stream. The formation of the precipitate reduces the vapour pressure of the targeted gas species in the liquid thereby enhancing absorption and allowing the absorbent stream to operate with higher loading than that of a simple gas liquid absorption process. A benefit this can provide is that it may reduce the energy requirement to separate the targeted gas species.

However, when no precipitate is formed it will be appreciated that the absorbent may not be a phase changing absorbent.

When the targeted gas species is an acid gas, for example carbon dioxide in a post combustion gas stream, or a pre-combustion gas stream such as syn-gas, ideally, the absorbent (often referred to as a solvent) may be an aqueous form of either one of: i) an alkali carbonate, ii) an amine absorbent, iii) an amino acid salt, iv) ammonia or v) any other aqueous or non-aqueous solvent. The absorbent may be a liquid absorbent that is substantially free of precipitates including the targeted gas species prior to being loaded, for example, fed to the contactor. The absorbent fed to the contactor may be saturated, such that absorption of the targeted species, such as carbon dioxide, results in the formation of precipitates or a slurried mixture.

In the case where the absorbent is alkali carbonate or ammonia the precipitate formed may be alkali bicarbonate. Other solvents may produce other chemical compounds as precipitates. Many absorption solvents contain promoters to enhance reaction/absorption kinetics and these additional materials may or may not form precipitates which can be handled and treated in a way that optimizes the economics of the process.

The absorbent of the absorbent stream may include a solid phase reactant, such as dirt or minerals that can absorb acid gases. After passing through the contactor, the solid phase reactant may be separated from the absorbent stream using suitable means, such as a settlement pond, cyclone separator or filtration.

Throughout this specification, references to the "loading", "loading of the absorbent", or variations thereof, refers to the molar proportion of the targeted species into the absorbent stream on a scale of 0-1, where the loading a totally regenerated stream is zero and loading of a totally loaded stream is 1. By way of example, when the targeted species is $CO_2$ and the absorbent is alkali carbonate, the loading of $CO_2$ incorporated into the alkali carbonate/alkali bicarbonate mixture, a loading of zero represents a solution containing only alkali carbonate and the loading of a solution containing only alkali bicarbonate is 1. In this example, the loading is equivalent to moles of $CO_2$ absorbed per mole of $K_2CO_3$.

If present, the precipitates formed by precipitation of loaded absorbent can provide additional surface area to facilitate liquid gas contact. A difficulty with relying solely on the precipitates to provide a site for liquid gas contact is that the surface area of the precipitates can be less well defined as the precipitate itself is undergoing growth, and hence exhibiting dynamic changes in particle size and surface area and furthermore they may be affected by temperature or concentration change and as such be less reliable in providing enhanced surface area in the system.

The absorbent stream may have any suitable concentration to facilitate the formation of precipitates in the fluidized bed, for example, with potassium carbonate the range of 30 to 60 wt % would be preferred. Ideally, the concentration of potassium carbonate would be in the range of 40 to 60 wt %, and suitably in the range of 45 to 60 wt %.

The process may include using the secondary particles when there is no precipitate. Similarly, the secondary particles may be used when precipitates are being formed. In any event, the secondary particles can be used to:
- ensure that enhanced surface area is provided independent of any processing variability which might affect precipitation,
- utilise the fact that particles are already being handled in the system and hence can make up for any other system deficiency, and
- increase surface area and overcome or reduce the need for promoters or kinetics enhancement chemicals
- enhance surface area for any liquid/gas separation system where the addition of particles can be tolerated/engineered into the process Reaction rates of the targeted gas by the absorbent solution increase as the temperature of the solvent solution increases. However, absorption rates, as shown Equation 1, are affected by range of additional criteria. We have found that the heat of absorption of targeted gas and the heat of precipitation of the precipitate can provide a temperature rise which, without careful temperature control, can detrimentally affect the amount of absorption of the targeted gas due to temperature driven mass transfer effects and negate the benefits that a phase change solvent can deliver. Moreover, as the temperature of the absorbent increases, the solubility of the precipitate also increases thereby reducing the ability of, or indeed the possibility of, forming precipitates in the contactor vessel.

The process may include controlling the temperature of the absorbent stream in the fluidised bed and/or the fluidised bed itself. In the situation in which the absorbent is potassium carbonate, the temperature of the absorbent stream and/or the fluidised bed is controlled to a temperature profile ranging from 40 to 95° C. In one embodiment, controlling the temperature may include cooling the absorbent in situ in the contactor vessel. For example, the contactor vessel may include cooling tubes/plates extending through at least a part of the contactor vessel for conveying a temperature control medium or coolant therethrough while still providing the necessary gas and liquid/slurry contact.

In another example, controlling the temperature of the absorbent may include withdrawing one or more side streams of the absorbent from the contactor vessel, cooling the side streams and returning the side streams to the contactor vessel.

The process may include at least a portion of the product stream being recirculated through the fluidised bed, as a recirculating stream. The recirculating stream may be fed to an upper portion of the fluidised bed and can mix with the absorbent stream in the fluidized bed to increase liquid holdup and increase turbulence.

In an embodiment, the process may include multiple fluidised beds connected in series in which the gas stream is conveyed through consecutive fluidised beds defining a first fluidised bed and a further fluidised bed in the direction of travel of the gas stream, and the absorbent stream is conveyed in an opposite direction from the further fluidised bed to the first fluidised bed with in which intermediate substreams of the absorbent stream are conveyed between the consecutive fluidised beds, and a recirculating stream discharged from a lower portion of the fluidised bed is conveyed back to an upper portion of the same fluidised bed.

Optimisation of the flowrates of the absorbent stream and the recirculated stream in the fluidised bed compared to the gas stream, may be referred to as the liquid/gas ratio (often referred to as L/G) of the fluidised bed and multiple staging of beds.

In the case of such liquid/gas ratio optimisation, for single or multiple bed contactors, the liquid/gas ratio for a particular bed may be different from the others and indeed different from the overall liquid/gas ratio desired for the optimal energy performance of the absorption/regeneration process, namely where the liquid/slurry flow from the regenerator is the numerator of the L/G ratio and the overall gas to the absorber is the denominator.

BRIEF DESCRIPTION OF THE DRAWINGS

A preferred embodiment of the invention will now be described with reference to the accompanying drawings, of which.

DETAILED DESCRIPTION

Figure 1:
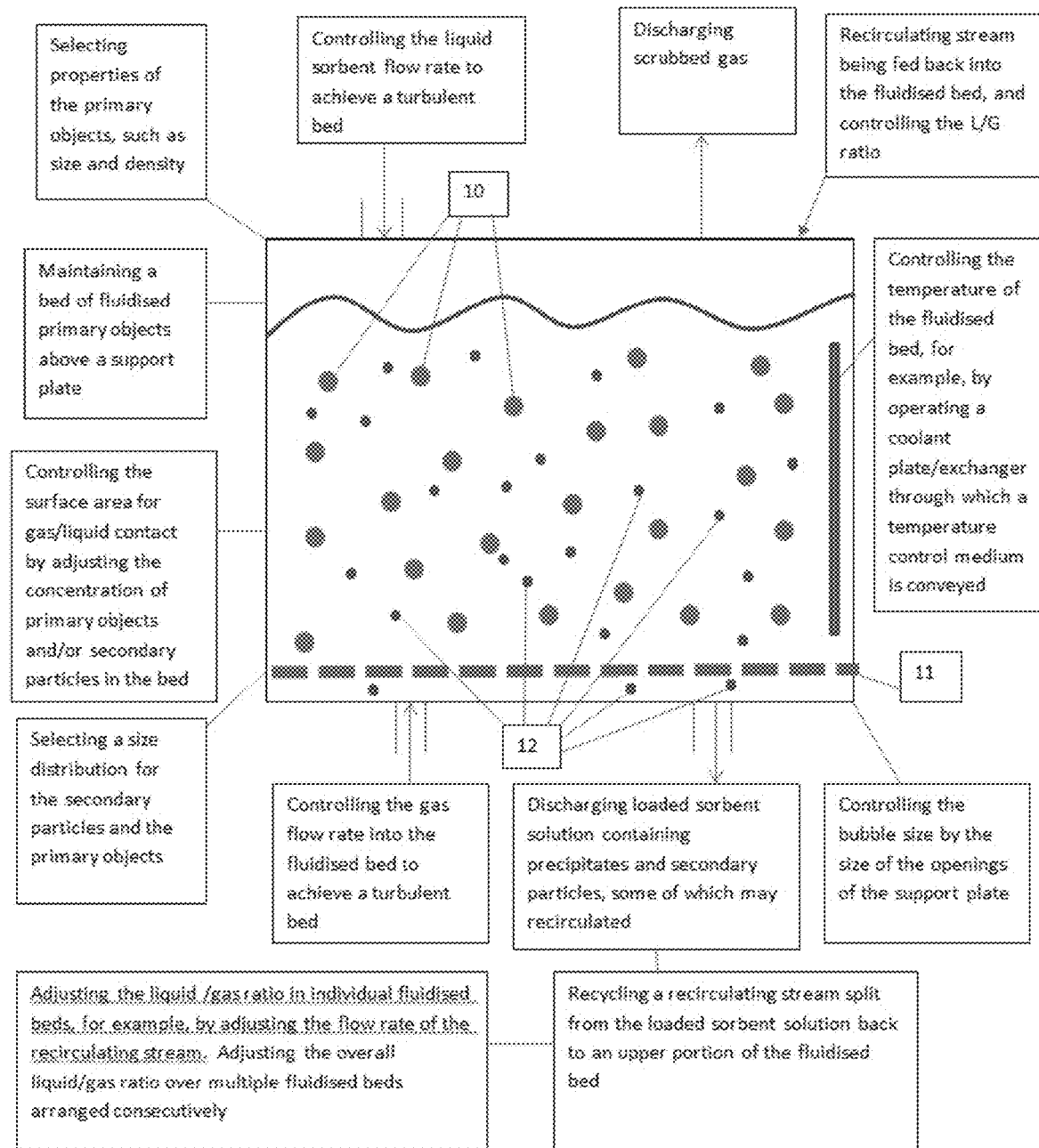
FIG. 1 is a schematic diagram of a process including a fluidised bed containing both primary objects and secondary particles in a vessel.

With reference to FIG. 1, the primary objects 10, represented by the larger circles, are confined to the bed during operation on a support plate 11, and the secondary particles 12, represented by the dots, are discharged from the bed by being entrained in the absorbent that is discharged from the bed. The process may include any one or more of the following:

- controlling the flowing rate of the liquid/slurry absorption stream entering the contactor to create a turbulent bed;
- controlling the flow rate of gas entering into the fluidised bed to create a turbulent bed;
- individually controlling the ratio of liquid and gas to the fluidised bed or beds to create turbulence and holdup, and pressure drop;
- selecting properties of the primary objects, such as size and density;
- controlling the surface area for gas/liquid contact by adjusting the concentration of primary objects and/or secondary particles in the bed, and/or bed hold-up;
- selecting a size distribution for the secondary particles and/or that of the primary objects;
- controlling the bubble size by the size of the openings in the support plate;
- controlling the temperature of the fluidised bed, for example, by operating an internal or external heat transfer device or surface area through which a temperature control fluid is conveyed;
- controlling the temperature of the fluids bed, for example by withdrawing a side stream from each and cooling the side stream;
- controlling an L/G ratio of the fluidised bed by adjusting the flow rate of the recirculating stream; and
- controlling an overall L/G ratio of multiple fluidised beds at a value, possibly different to that of the L/G ratio for individual beds, so as to optimise energy performance of an integrated absorber and regenerator.

The L/G ratio can also be controlled by adjusting flow rates of either one of the gas stream or the absorbent stream. The side stream withdrawn from the fluidized bed for cooling can also be used as the recirculating stream for controlling the L/G ratio of the fluidized bed.

Figure 3:
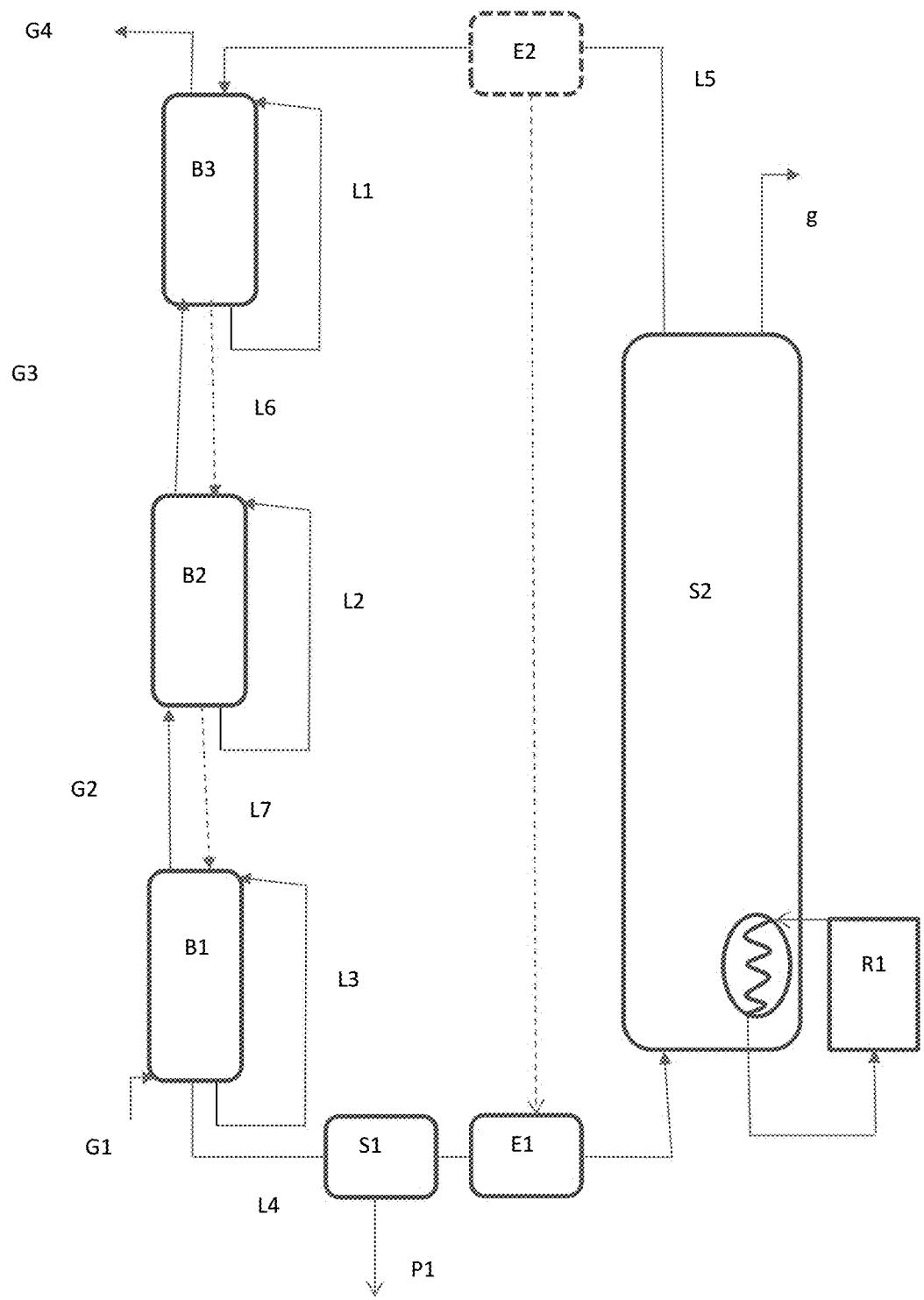
FIG. 3 is a schematic illustration of a process having three fluidised beds and an integrated regenerator, in which a gas stream is conveyed through consecutive fluidised beds and an absorbent stream is conveyed in an opposite direction, and a recirculating stream is provided on each fluidised bed to achieve a desired L/G ratio.

FIG. 3 is a schematic illustration of a process including three fluidised beds B1, B2 and B3, for absorbing acid gases from a gas stream such as carbon dioxide, $SO_X$ and $NO_X$ and a regenerator S2. The configuration may vary depending on the relative pressures of the absorber and regenerator and it is provided for illustration and not intended to limit the potential layout in practice. The gas stream G1 is fed into B1 and may include, for example 15% carbon dioxide. Gas stream G2 is conveyed from the B1 to B2 and gas stream G3 is conveyed from B2 to B3. Gas stream G4 which is depleted in acid gas and discharged from the fluidised bed B3 last in the direction of flow of the gas stream, may for example, have a carbon dioxide content of approximately 1.5%. The regenerated absorbent stream L5 is conveyed in an opposite direction to the gas stream and substreams L6 and L7 are conveyed between B3 to B2, and between B2 and B1 respectively. A loaded product stream L4, which may be a slurry stream loaded with precipitate or mineral particles is discharged from B1.

The fluidised bed depicted in FIG. 1 may represent each of the fluidised beds B1 to B3 in FIG. 3.

The benefit of the process of FIG. 3 is that in order to maintain an adequate mass transfer driving force, and in particular to minimise the impact of one or more pinches in the mass transfer driving force, the multiple fluidised beds can be operated to enhance performance in each bed B1, B2 and B3. For instance, the flow rates of the recirculation streams L1, L2 and L3 can be adjusted for each fluidised bed B1, B2 and B3 to optimise performance, including factors such as turbulence of the fluidised beds B1, B2 and B3, renewal of the absorbent solution at the interface between the gas and the absorbent at the surface of the primary objects; and operating a temperature control medium in each of the fluidised beds B1, B2 and B3 based on the conditions in each of the fluidised beds B1, B2 and B3.

As mass transfer proceeds in the fluidised beds B1, B2 and B3, it is expected that the liquid to gas ratio, more particularly the flow rates of the absorbent stream and the gas stream will be particular to each fluidised bed B1, B2 and B3. The liquid to gas ratios for each fluidised bed B1, B2 and B3 may be expressed as follows:

Ratio 1 (B3) (L5+L1)/G3

Ratio 2 (B2) (L6+L2)/G2

Ratio 3 (B1) (L7+L3)/G1

Ratios 1 to 3 may each be different, and in addition, ratios 1 to 3 may differ to an overall liquid/gas ratio of L5/G1 (Ratio 4).

Although not shown in FIG. 3, mineral particles, if present in the product stream L4, may be removed before being fed into the regenerator S2, such as that shown by separator S1 and stream P1. Precipitates if present in the product stream L4 (with or without secondary particles), may be fed into the regenerator S2 after heating in heat exchanger E1, allowing carbon dioxide to be volatilized therefrom. Heat exchanger E1 may optionally be heated using heat from recuperative heat exchanger E2. Ideally, the regenerated absorbent stream L5 is substantially free of precipitates. In addition, although not show in FIG. 3, E1 and E2 may also be provided on opposite sides of the single heat exchanger.

Although not shown in the FIG. 3, the regenerator S2 may be in form of a fluidised bed such as that shown in FIG. 1 or a conventional regenerator. The regenerator S2 may also include a conventional reboiler R1.

Example

A set of trials has been conducted in which carbon dioxide was absorbed into a 30% potassium carbonate solution.

The process was carried out in a contactor vessel included a nominal 200 mm diameter Perspex column containing primary objects in the form of 40 mm spherical balls having a density of 80 kg/m3 at a column height of approximately 600 mm (before fluidization). The balls where fluidized with a closed loop recirculating gas stream of carbon dioxide with the injection of carbon dioxide from gas bottles to replace $CO_2$ as it is absorbed. A bleed stream was continuously withdrawn from the closed loop to ensure that an excess of $CO_2$ was present in the loop throughout the trial. An absorbent stream containing 30 wt % potassium carbonate was recirculated through the bed.

Figure 2:
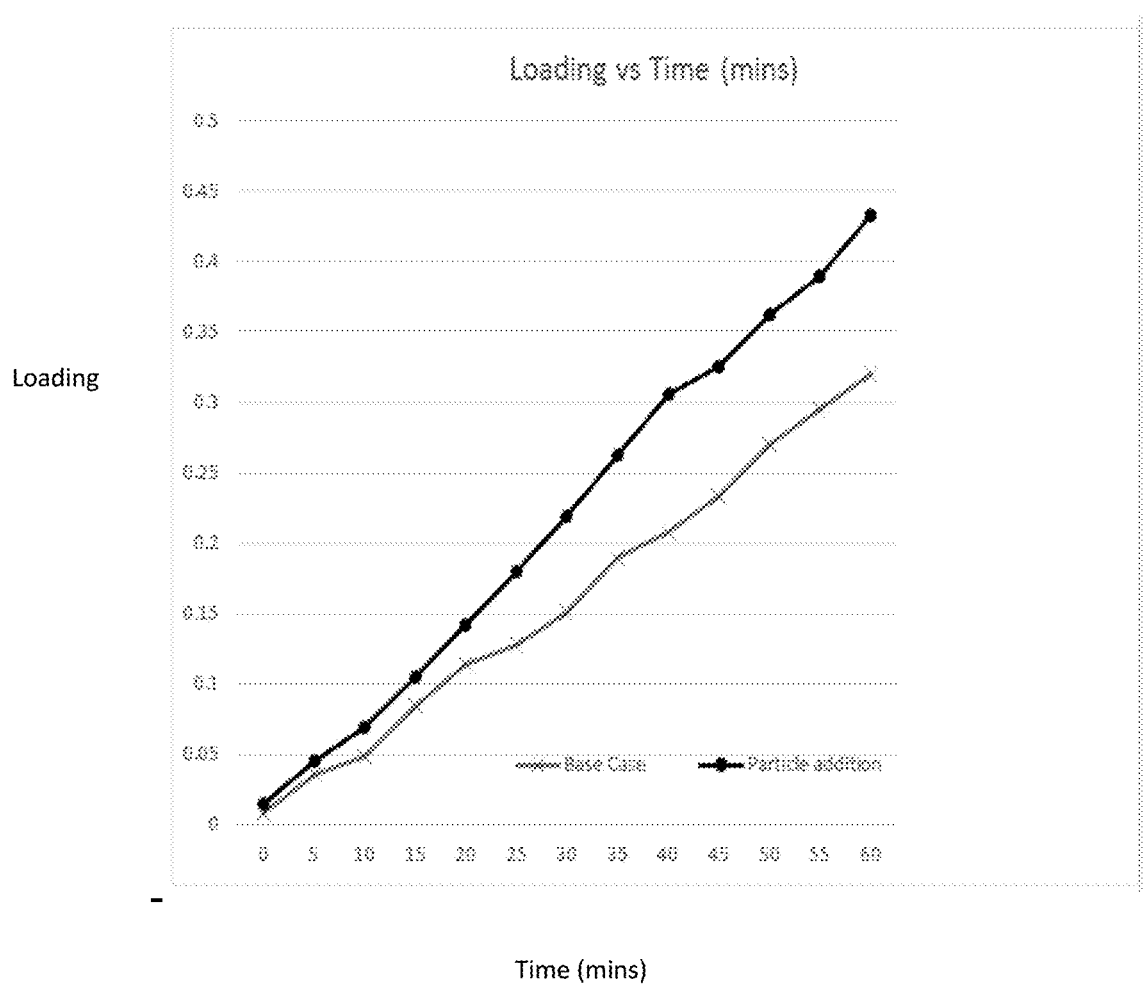
FIG. 2 is a graph illustrating trial results including loading of a 30 wt % alkali solution recirculated through a fluidized bed such as that shown in FIG. 1.

A range of flow parameters were monitored and controlled to ensure that the balls moved in a turbulent manner in the column throughout multiple one-hour tests. The progress of the absorption was monitored via pH with regular samples taken. These samples were later analyzed and a profile of the absorption produced providing a "base-case" of the turbulent gas absorber. FIG. 2 illustrates the increase in loading of the absorbent from 0 to about 0.33 during the course of the trial.

The trial was then repeated in which a number of different secondary particles in the form of inert beads having a size range from 0.2-1000 microns were added to the circulating absorbent. The inert beads were added at various concentrations, including in the range of 0.5 to 14.0 wt % to the fluidised bed. The primary objects, i.e., the balls were retained in the contactor vessel.

The trials showed that the addition of secondary particles resulted in an improved absorption of carbon dioxide into 30% potassium carbonate solution as shown in the FIG. 2. Specifically, the loading of the absorbent increased to a total of approximately 0.43. The improvement showed a 40% increase on the base case.

Potential benefits and advantages of the described embodiments include the following.

There is a move in the carbon capture and storage (CCS) space, and in carbon capture particularly, for solvents that exhibit a phase change, i.e. those which produce solid precipitates e.g. chilled ammonia, amino acids or potassium carbonate amongst others. This phase change can facilitate large reductions in energy usage for the separation of carbon dioxide. Unfortunately, the phase change solvents also tend to exhibit slower absorption kinetics and can exhibit higher viscosities that might impact fluid flow during gas liquid contacting. The embodiments are also suited to a range of other gas absorption solvent systems used in CCS and the chemical processing industries broadly.

The confluence of the solids capability of a turbulent gas absorber, the higher mass and heat transfer potential due to the turbulent contacting conditions and a broader window of operation make it attractive for new phase change solvents. The potential for process intensification and the modest column internals requirement also make it attractive for equipment costs reductions in carbon capture and storage applications.

The maximisation of contact area is critical for large scale carbon dioxide capture systems due to the significant size and capital costs of these systems and any means by which the process can be intensified is valued. Typical contact surface area for turbulent gas absorbers is some function of the liquid, gas and solid phases in the contactor and the respective flows and properties of the gas and liquid streams.

Various embodiments described herein increase the basic surface area for liquid gas contact and facilitate the use of the phase change solvents by the following.

Reducing the size of the primary fluidising object (at or below the 'diameter' considered ideal for conventional turbulent gas absorbers). The primary objects can be of any shape that has been deemed useful by the prior art.

Introducing secondary particles of discrete sizes to produce greater surface area. In addition, the secondary particles may have an inherent or engineered catalytic behaviour that can increase basic reaction kinetics.

Allow precipitates to form within the contactor to act as additional surface area.

The embodiments described herein provide a process for determining how best to exploit the benefits of the added area in turbulent gas absorber/regenerator with area enhancement through the addition of heterogeneous particles of various forms. This occurs through the selection of the primary fluidising objects, additional secondary particles having the option of catalytic promoters, and selecting for the primary objects and the secondary particles the size, density, material of construction and catalytic behaviour to create the necessary mass and heat transfer. These parameters will be modified based on the basic system chemical behaviour and fluid properties to define the area needed within the process constraints, such as pressure drop and then be deployed with specific changes that maximise the ability for that surface area to be used in the most effective manner.

The embodiments described herein are particularly well suited for handling phase change solvents where the liquids transform into solids as the contacting process progresses, e.g. through solid precipitation as solubility limits are met and exceeded. This enables slurries to be processed in a new gas/liquid/solids absorber system.

The embodiments are well suited for processing of slurries where the liquid and solids therein can be contacted with a gas stream either for reaction and/or gas absorption purposes.

The turbulent gas absorber reduces the need for fixed column packing, reducing cost. The bed expansion provides extra contact volume/holdup dynamically.

The operating window for the contactor provides processing flexibility.

The potential for process intensification is valuable for a range of gas processing situations.

The embodiments provide a combination of high surface area, high solids tolerance and at an acceptably low pressure drop that can be used to apply to systems requiring these features.

The invention claimed is:

1. A process in which a targeted gas species is absorbed by an absorbent, the process including:

providing a vessel containing fluidisable packing, hereinafter referred to as primary objects, the vessel having an absorbent inlet located in an upper portion of the vessel via which an absorbent stream containing an absorbent is fed into the vessel, and a gas inlet located in a lower portion of the vessel via which a gas stream containing a targeted gas species enters the vessel;

feeding the gas stream into the gas inlet and conveying the gas stream as bubbles upwardly in the vessel to fluidize the primary objects and form a fluidized bed within the vessel;

feeding the absorbent stream into the absorbent inlet and conveying the absorbent stream downwardly in the vessel so that the absorbent stream absorbs the targeted gas species from the gas stream and forms a precipitate that reduces the partial pressure of the targeted gas species in the absorbent stream while being conveyed through the fluidized bed of the vessel;

controlling flow rates of the gas stream and the absorbent stream through the bed so that the primary objects move within the fluidized bed, creating turbulence in the absorbent stream and the gas stream in the fluidized bed, and liquid hold-up in the fluidized bed; and withdrawing from the vessel a loaded product stream having a liquid phase rich in the targeted gas species, and the precipitate, while the primary objects are retained in the vessel;

regenerating the loaded product stream to produce a regenerated absorbent and a gas stream rich in the targeted gas species, and the regenerated absorbent is used to form at least part of the absorbent stream that is fed to the vessel;

wherein the process includes at least a portion of the loaded product stream being recirculated back to the fluidized bed, as a recirculating stream, without being subject to the regenerating step;

wherein the vessel has a liquid/gas ratio, hereinafter referred to as the fluidized bed liquid/gas ratio, which is the sum of the flow rates of absorbent stream and the recirculating stream being fed to the vessel, compared to the flow rate of the gas stream being fed to the vessel, and an overall liquid/gas ratio which is the flow rate of the absorbent stream to the flow rate gas stream being fed to the vessel;

and the process comprises:
a. controlling the fluidized bed liquid/gas ratio by adjusting the flow rate of the recirculating stream, which in turn controls the turbulence and liquid hold-up in the fluidized bed; and
b. controlling the overall liquid/gas ratio in which the overall liquid/gas ratio differs from the fluidized bed liquid/gas ratio.

2. The process according to claim 1, wherein the turbulence of the fluidized bed is characterised by a pressure drop in the range of 0.5 to 5 kPa/m of bed height.

3. The process according to claim 1, wherein the primary objects create turbulent flow of the absorbent stream over at least 75% of the height of the bed.

4. The process according to claim 1, wherein the primary objects have a diameter or an equivalent diameter, in the range of 5 to 50 mm.

5. The process according to claim 1, wherein the primary objects may have a density in the range of 80 to 500 kg/m3.

6. The process according to claim 1, wherein the process includes controlling the size of the bubbles of the gas stream in the fluidized bed to adjust one or more of the following properties of the fluidized bed, namely: turbulence of the fluidized bed, and renewal of the absorbent stream on the surface of the primary objects.

7. The process according to claim 1, wherein the targeted gas species is an acid gas and the absorbent is a solvent that can exhibit a phase change on absorbing the acid gas, and produce the precipitate in situ in the fluidized bed.

8. The process according to claim 1, wherein the absorbent is an alkali carbonate and the targeted gas species includes carbon dioxide.

9. The process according to claim 8, wherein the alkali carbonate is potassium carbonate and the absorbent stream has a weight ranging from 30 to 60 wt %.

10. The process according to claim 1, wherein the process includes controlling the temperature of the fluidised bed to negate the heat of absorption of targeted gas by the absorbent stream, and the heat of precipitation of the precipitate so that neither effects the amount of absorption of the targeted gas species due to temperature effects on mass transfer.

11. The process according to claim 10, wherein controlling the temperature of the absorbent stream in the fluidized bed includes either one or a combination of: i) cooling tubes or plates extending through at least a part of the contactor vessel for conveying a temperature control medium or coolant therethrough while still providing the necessary gas and liquid/slurry contact; or ii) withdrawing one or more side streams of the absorbent stream from the contactor vessel, cooling the side streams and returning the side streams to the contactor vessel.

12. The process according to claim 1, wherein when the targeted gas species includes carbon dioxide and the absorbent is an alkali carbonate, the loaded product stream has a loading in the range of 0.5 to 1.0.

13. The process according to claim 1, wherein the process includes conveying secondary particles that are smaller than the primary objects, through the fluidized bed, in which the secondary particles provide additional surface area for the absorbent stream to absorb the targeted species.

14. The process according to claim 13, wherein the process includes any one or a combination of the following features A) to G):
A) secondary particles are either one or a combination of: i) entrained in the absorbent stream and passes through the bed with the absorbent stream; or ii) a makeup stream of the secondary particles is added to the fluidized bed and/or the absorbent stream and passes through the bed with the absorbent stream;
B) the process includes controlling the total surface area for liquid/gas contact in the bed by adjusting the concentration of the secondary particles in the fluidized bed while the fluidized bed is in operation;
C) the secondary particles are inert to the gas stream and the absorbent stream; D) the secondary particles are reactive with the gas stream and include mineral particles that can react with the targeted gas species;
E) the secondary particles have a catalytic constituent to enhance the reaction kinetics of the absorption of the targeted species by the absorbent stream;
F) the primary objects have a catalytic constituent to enhance the reaction kinetics of the absorption of the targeted species by the absorbent stream;
G) the process further includes selecting the size of the secondary particles based on one or more of the following parameters:
  i) the size of the bubbles created by the gas stream,
  ii) the flow rates and fluid properties of the gas stream and the absorbent stream in the fluidised bed,
  iii) the density, particle size and concentration of the secondary particles in the fluidised bed, and the density, size and concentration of the primary particles in the bed;
H) the secondary particles have a cross-sectional size in the range of 0.2 to 5000 micron, and the secondary particles pass through a physical divider that retains the primary objects in the fluids bed.

15. The process according to claim 13, wherein the regenerated stream has a loading of less than 0.5 and the absorbent stream fed to the contactor is substantially free of precipitates.

16. The process according to claim 15, wherein the secondary particles are conveyed through the regeneration step to help volatilize the targeted gas species from the absorbent and provide surface area to enhance desorption.

17. The process according to claim 1, wherein controlling the overall liquid/gas ratio includes adjusting the flowrates of the absorbent stream to optimise the energy performance of the absorption/regeneration steps.

18. The process according to claim 1, wherein the process includes multiple fluidised beds contained in at least one of the vessels, the multiple fluidised beds being connected in series in which the gas stream is conveyed through consecutive fluidised beds defining a first fluidised bed and a further fluidised bed in the direction of travel of the gas stream, and the absorbent stream is conveyed in an opposite direction from the further fluidised bed to the first fluidised bed in which intermediate substreams of the absorbent stream are conveyed between the consecutive fluidised beds, and the recirculating stream is discharged from a lower portion of at least two of the fluidised beds is conveyed back to an upper portion of the same fluidised bed, and controlling the flow rate of the recirculating stream.

19. A process in which a targeted gas species is absorbed by an absorbent, the process including:
providing a vessel containing fluidisable packing hereinafter referred to as primary objects, a gas inlet located in a lower portion of the vessel via which a gas stream containing a targeted gas species enters the vessel, and an absorbent inlet located in an upper portion of the vessel via which an absorbent stream containing an absorbent is fed into the vessel;
feeding the gas stream into the gas inlet and conveying the gas stream upwardly in the vessel so as to fluidize the primary objects and form a fluidized bed within the vessel;
feeding the absorbent stream into the sorbent inlet and conveying the absorbent stream downwardly in the vessel to allow the absorbent stream to absorb the targeted gas species from the gas stream while being conveyed through the fluidized bed of the vessel;
controlling the flow rates of the gas stream and the absorbent stream through the bed so that the primary objects move within the fluidized bed, create turbulence, and liquid hold-up;
withdrawing from the vessel a product stream having liquid phase rich in the targeted gas species, while the primary objects are retained in the vessel;
regenerating the loaded product stream to produce a regenerated absorbent and a gas stream rich in the targeted gas species, and the regenerated absorbent is used to form at least part of the absorbent stream that is fed to the vessel;
wherein the process includes at least a portion of the loaded product stream being recirculated back to the fluidised bed, as a recirculating stream, without being subject to the regenerating step;
wherein the vessel has a liquid/gas ratio, hereinafter referred to as the fluidized bed liquid/gas ratio, which is the sum of the flow rates of absorbent stream and the recirculating stream being fed to the vessel, compared to the flow rate of the gas stream being fed to the vessel, and an overall liquid/gas ratio which is the flow rate of the absorbent stream to the flow rate gas stream being fed to the vessel;
and the process comprises:
a. controlling the fluidized bed liquid/gas ratio by adjusting the flow rate of the recirculating stream, which in turn controls the turbulence and liquid hold-up in the fluidised bed; and
b. controlling the overall liquid/gas ratio in which the overall liquid/gas ratio differs from the fluidized bed liquid/gas ratio.

20. The process according to claim 19, process includes any one or a combination of the following features A) to G):
A) conveying secondary particles that are smaller than the primary objects through the fluidized bed, the secondary particles being either inert, reactive or having a catalytic effect in relation to the targeted gas species;
B) conveying secondary particles that include mineral particles that are reactive to the targeted species;
C) the secondary particles are either one or a combination of: i) entrained in the absorbent stream and passes through the bed with the absorbent stream; or ii) a makeup stream of the secondary particles is added to the fluidized bed and/or the absorbent stream and passes through the bed with the absorbent stream;
D) the process includes controlling the total surface area for liquid/gas contact in the bed by adjusting the concentration of the secondary particles in the fluidised bed while the fluidised bed is in operation;
E) the process further includes selecting the size of the secondary particles based on one or more of the following parameters:
i) the size of the bubbles in the gas stream,
ii) the flow rates and fluid properties of the gas stream and the absorbent stream in the fluidised bed,
iii) the density, particle size and concentration of the secondary particles in the fluidised bed, and
iv) the density, size and concentration of the primary particles in the bed;
F) the turbulence of the fluidized bed is characterised by a pressure drop in the range of 0.5 to 5 kPa/m of bed height;
G) the primary objects create turbulent flow of the absorbent stream over at least 75% of the height of the bed;
H) the primary objects have a diameter or an equivalent diameter, in the range of 5 to 50 mm;
I) the primary objects may have a density in the range of 80 to 500 $kg/m^3$.

21. The process according to claim 19, wherein the primary objects have a catalytic constituent to enhance the reaction kinetics of the absorption of the targeted species by the absorbent stream.

22. The process according to claim 19, wherein the absorbent is a solvent that does not undergo a phase change as a result of absorption of the targeted gas species, and therefore does not produce precipitates in situ in the fluidised bed.

23. The process according to claim 19, wherein process includes controlling the size of the bubbles created by the gas stream in the fluidized bed to adjust one or more of the following properties of the fluidized bed, namely: turbulence of the fluidized bed, and renewal of the absorbent stream on the surface of the primary particles.

24. The process according to claim 19, wherein the process includes controlling the temperature of the fluidised bed to negate the detrimental temperature effects of the heat of absorption of targeted gas into the absorbent stream, and wherein controlling the temperature of the absorbent stream in the fluidised bed includes either one of: i) cooling tubes or plates extending through at least a part of the contactor vessel for conveying a temperature control medium or coolant therethrough while still providing the necessary gas and liquid/slurry contact; or ii) withdrawing one or more side streams of the absorbent stream from the contactor vessel, cooling the side streams and returning the side streams to the contactor vessel.

25. The process according to claim 19, wherein controlling the overall liquid/gas ratio includes adjusting the flow-rates of the absorbent stream to optimize the energy performance of the absorption/regeneration steps.

26. The process according to claim 19, wherein the process includes multiple fluidized beds contained in at least one of the vessels, the fluidized beds being connected in series in which the gas stream is conveyed through consecutive fluidized beds defining a first fluidized bed and a further fluidized bed in the direction of travel of the gas stream, and the absorbent stream is conveyed in an opposite direction from the further fluidized bed to the first fluidized bed in which intermediate substreams of the absorbent stream are conveyed between the consecutive fluidized beds, and the recirculating stream is discharged from a lower portion of at least two of the fluidized beds is conveyed back to an upper portion of the same fluidized bed, and controlling the flow rate of the recirculating stream, and wherein the process includes controlling the flow rate of the or each recirculating stream so that the primary objects move within the fluidized bed, creating turbulence, and liquid hold-up, and wherein the process includes controlling an overall liquid/gas ratio being the ratio of absorbent stream fed into the absorbent inlet to the gas stream fed into the gas inlet.

\* \* \* \* \*